United States Patent [19]

Blase

[11] Patent Number: 4,962,639

[45] Date of Patent: Oct. 16, 1990

[54] CHAIN LINK FOR A POWER-SUPPLY CHAIN

[76] Inventor: Günter Blase, Oberkulheim 10, D-5060 Bergisch Gladbach 2, Fed. Rep. of Germany

[21] Appl. No.: 423,474

[22] PCT Filed: Mar. 25, 1988

[86] PCT No.: PCT/DE88/00194

§ 371 Date: Sep. 26, 1989

§ 102(e) Date: Sep. 26, 1989

[87] PCT Pub. No.: WO88/07637

PCT Pub. Date: Oct. 6, 1988

[30] Foreign Application Priority Data

Mar. 26, 1987 [DE] Fed. Rep. of Germany ....... 3709953

[51] Int. Cl.$^5$ .............................................. F16G 13/16
[52] U.S. Cl. ...................................... 59/78.1; 248/49; 248/51
[58] Field of Search .......................... 59/78.1, 900, 78; 248/48, 50, 51, 49, 78

[56] References Cited

U.S. PATENT DOCUMENTS

| | | | |
|---|---|---|---|
| 3,848,407 | 11/1974 | Moritz | 59/78.1 |
| 4,018,411 | 4/1977 | Hennig | 59/78.1 |
| 4,104,871 | 8/1978 | Moritz | 59/78.1 |
| 4,590,961 | 5/1986 | Schumann | 59/78.1 |
| 4,626,233 | 12/1986 | Moritz | 59/78.1 |

FOREIGN PATENT DOCUMENTS

| | | |
|---|---|---|
| 2134878 | 2/1973 | Fed. Rep. of Germany . |
| 2749248 | 5/1979 | Fed. Rep. of Germany ....... 59/78.1 |
| 8513491 | 8/1985 | Fed. Rep. of Germany . |
| 8524845 | 11/1985 | Fed. Rep. of Germany . |
| 2007326 | 5/1979 | United Kingdom . |

Primary Examiner—David Jones
Attorney, Agent, or Firm—Browdy and Neimark

[57] ABSTRACT

In a chain link for power-supply chains, which comprises side plates connected by means of transverse webs, the power-supply chain being intended for receiving cables, hoses and the like, and the chain links being designed for articulated connection to adjacent chain links, partition webs are inserted between the transverse webs and are held by the transverse webs. Intermediate webs are inserted between the transverse webs and are held by the partition webs in predetermined positions parallel to the transverse webs. In a special version, the intermediate webs are equipped with locking lugs at their ends, and the partition webs are equipped, on one side or both sides, and additional closing webs, on one side, with retaining grooves for pushing in the locking lugs. The lengths of the intermediate webs are appropriately selected according to a grid pattern. The inserted partition webs and intermediate webs allow a division, selectable within wide limits, of the interior or of the passage cross-section of each chain link and consequently an orderly guidance of the cables or hoses.

4 Claims, 5 Drawing Sheets

CHAIN LINK FOR A POWER-SUPPLY CHAIN

The invention relates to a chain link for a power-supply chain, the said chain link comprising two side plates connected by means of transverse webs and designed for articulated connection to adjacent chain links, its interior bounded by the side plates and the transverse webs being subdivided by partition webs inserted between the transverse webs and extending perpendicularly relative to these and by intermediate webs inserted between adjacent partition webs and extending perpendicularly relative to these.

Power-supply chains of this type serve for receiving cables, hoses and the like. The chain links are made box-shaped for this purpose. The articulated connection is obtained because the side plates are equipped alternately with pins and circular orifices, the pins of one chain link engaging into the recesses of the following chain link. However, the articulated connection can also be made in any other way.

The pivotability of successive chain links relative to one another is limited by stops or in another way.

Such chain links of known power-supply chains are generally produced from thermoplastic, specifically either each in one piece of else composed of several parts.

As to the art, DE-PS No. 34 14 412 is to be mentioned, showing a power-supply chain, wherein each chain link is built by side plates and transverse webs and wherein the interior bounded by the side plates and the transverse webs is subdivided by partition webs. This is shown especially in FIGS. 2, 6 and 7 of the aforesaid reference. FIG. 2 moreover shows the articulated connection of the chain links.

Another reference as to the art is CH-PS No. 635 175, which shows as well a power-supply chain with inserted partition webs.

Another reference is DE-OS No. 35 31 066. The limitation of the pivotability of successive chain links by stops is to be seen there in FIGS. 4 and 5.

The invention relates to all the abovementioned types of chain links for power-supply chains.

To guide the inserted cables or hoses from one chain link to the next in an ordered manner and to preserve this order even during operation, the interior of each chain link is subdivided by the said partition webs and intermediate webs.

The disadvantage of a fixed connection of the partition webs to the transverse webs, for example in a one-piece version, is that a relatively large number of different chain links have to be kept ready for the various uses, thus making production and stockkeeping more expensive. It was therefore proposed to insert the partition webs loosely and retain them on the transverse webs by friction alone. However, this led to faults because individual partition webs fell out.

The object on which the invention is based is to design a chain link for a power-supply chain of the type mentioned in the introduction, so that the position of the partition webs can first be determined freely, but then the partition webs can be retained in the desired position in a simple way, without the danger that they will fall out.

According to the invention, this object is achieved because the partition webs designed as rectangular plates are arranged displaceably between the transverse webs and carry at their corners supporting lugs which project and engage in pairs round the transverse webs on the underside and which prevent the partition webs from falling out, because the partition webs are equipped on both sides with one or more retaining grooves distributed over their height and aligned respectively with one another on both sides, and because the intermediate webs carry, at their ends, locking lugs which can respectively be pushed selectively into one of the retaining grooves.

Although the partition webs of a chain link according to the invention are held non-positively by the transverse webs, as in the known versions, the intermediate webs connected to the transverse webs ensure a positive connection which prevents the partition webs from inadvertently shifting towards one side plate or the other. In particular, as soon as the partition web or partition webs are to be displaced laterally, the intermediate webs held by the partition webs become supported at their free ends on the side plates and prevent further displacement.

At the same time, the partition webs have, at their ends, supporting lugs, by means of which they respectively engage in a fork-shaped manner round one transverse web or the other on the underside.

The intermediate webs provided according to the invention form part spaces which allow a more comprehensive sorting of the inserted cables or hoses.

So that those ends of the intermediate webs facing the side plates of the chain link are given an even firmer hold, preferably a closing web is inserted at the ends of the transverse webs and, on its side resting against the side plate, has a fitting rib which engages into a fitting groove of corresponding shape and size in the side plate and which extends in the direction from one transverse web to the other. At the same time, the closing web, on its side located opposite the fitting rib, has one or more retaining grooves which are distributed over its height and which are aligned level with the retaining grooves in the partition webs. The fitting rib in conjunction with the fitting groove prevents the closing web from falling out under the effect of the cables which move back and forth somewhat during operation. Such a closing web is used especially when, because of the special design of the transverse webs near the side plates, it is no longer possible to insert directly against the side plate a partition web having supporting lugs and engaging round the transverse webs in a fork-like manner.

There, the ends of the intermediate webs are either only supported on the closing web or held by this closing web.

Preferably, for a chain link of a specific size partition webs and, if appropriate, closing webs are provided according to the distance between the transverse webs of the chain link. For this, it is then possible to keep in stock intermediate webs of different lengths which make it possible to subdivide the interior differently according to requirements. In order to utilize fully the space predetermined in this direction by the two side plates of the chain link, intermediate webs, the different lengths of which are calculated according to a desired grid pattern, are made available. The interior or passage cross-section of a chain link can be subdivided, for example, into part spaces of which the transverse dimensions are in a ratio of 1:2:4 or the like.

The locking lugs at the ends of the intermediate webs and the retaining grooves receiving these can be formed in various ways, a dovetail form proving especially expedient. A preferred design of the locking lugs and of the retaining grooves can be seen in FIGS. 3 to 8.

Preferably, the locking lugs extend only over some of the length of the end faces of the intermediate webs and near the other end of these end faces project locking studs to which locking holes in the partition webs for locking reception correspond.

Preferably, the bottom of each retaining groove forms, towards its end, a slope on which the locking stud slides when it is being pushed in.

The invention is explained in detail below in exemplary embodiments with reference to the drawing. In this:

Figure 1:
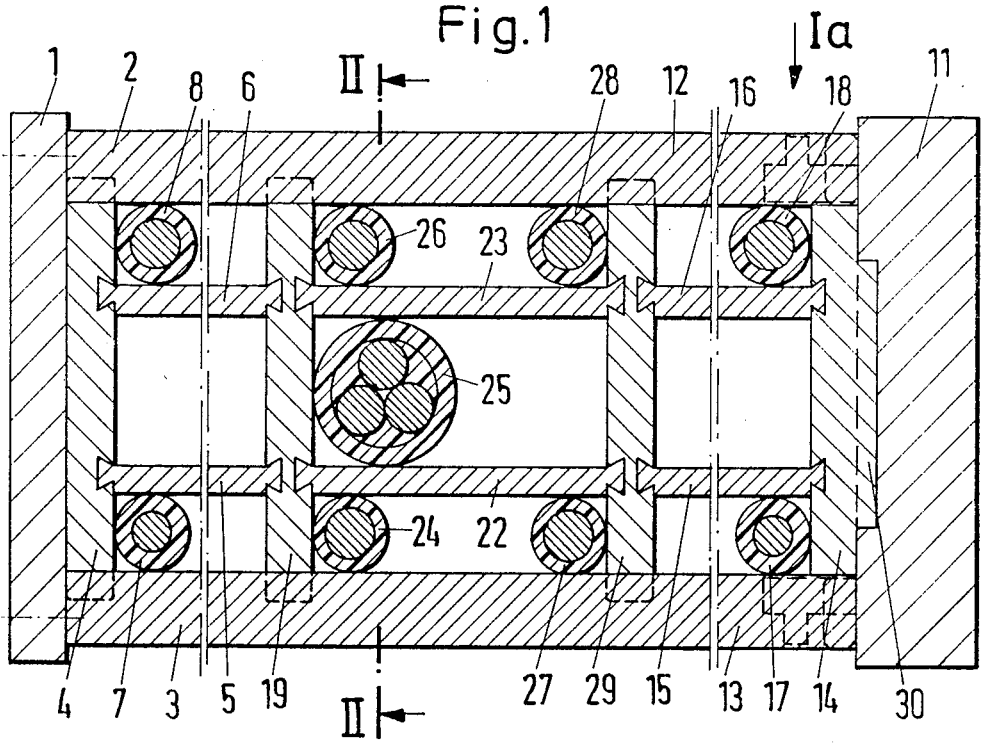
FIG. 1 shows a section through a chain link consisting of two side plates and two transverse webs connecting these, chain links of different type being shown left and right of the dot-and-dash centre line.

As already noted, a chain link is shown in section in the left-hand half of FIG. 1, and in this the transverse webs 2 and 3 are not widened at their ends, as in the newer type to be described below. Here, therefore, a partition web 4 with supporting lugs located at the ends can be inserted and brought close up to the side plate 1.

A further partition web 19 is inserted between the transverse webs at a distance from this partition web 4. The two partition webs 4 and 19 are connected firmly to one another by intermediate webs 5 and 6 by means of dovetail joints. Cables 7 and 8 are inserted into the three part spaces formed between the two partition webs.

The partition web 19 holds, on the side located opposite the intermediate webs 5 and 6, two further intermediate webs 22 and 23, themselves forming part spaces, in which cables 24, 25 and 26 are arranged.

Thus, the entire interior of the chain link between the left side plate and the right side plate (not shown) is subdivided by partition webs and intermediate webs.

In the other type illustrated on the right of the dot-and-dash centre line, the transverse webs 12 and 13 are connected to the side plates, of which the right side plate 11 is shown, by means of special plug connections without additional screws. In this type between the two transverse webs 12 and 13 there is a partition web 29 which, by means of dovetail joints, carries intermediate webs 15 and 16 extending towards the side plate 11. Two intermediate webs 22 and 23 are likewise arranged on the opposite side of the partition web 29. Cables 27 and 28 and, near the side plate 11, cables 17 and 18 are inserted into the part spaces formed between these intermediate webs and the transverse webs.

Whilst the partition web 29 is equipped, in the same way as the partition webs for the older type of chain link, with supporting lugs by means of which it engages round the transverse webs 12 and 13 in a fork-like manner, for the reasons given below this is no longer possible close up to the side plate 11. As can be seen from FIG. 1a, in particular the end of the transverse web 12 (and correspondingly also the end of the transverse web 13) is widened in the vicinity of the side plate 11, so that a partition web with supporting lugs, like the partition web 29, could not be brought close up to the side plate 11. Consequently, for such chain links another type, a somewhat modified closing web 14 is used at the side plate 11 (and correspondingly also at the opposite side plate not shown), instead of the partition web used in the middle. Once again, this closing web carries the intermediate webs 15 and 16 by means of a dovetail joint and at its ends is inserted non-positively between the upper transverse web 12 and the lower transverse web 13. However, this closing web does not possess any supporting lugs at its ends for the reasons given above. To prevent this closing web from sliding out in the longitudinal direction of the cables during operation, the closing web is equipped, on its side resting against the side plate 11, with a fitting rib 30 which extends in the direction from one transverse web to the other and which engages into a fitting groove of corresponding shape and size in the side plate 11. Of course, instead of a continuous fitting rib and corresponding fitting groove, fitting studs and fitting holes can also be used.

Thus, despite the widenings 31 of the transverse webs 12 and 13, the closing web 14 is retained immovably. Moreover, FIG. 1a shows a locking projection 32 which is located at the end of a pin projecting from the side plate 11 and which engages into a corresponding slot in the transverse web 12 and secures the plug connection between the side plate and transverse web.

Figure 2:
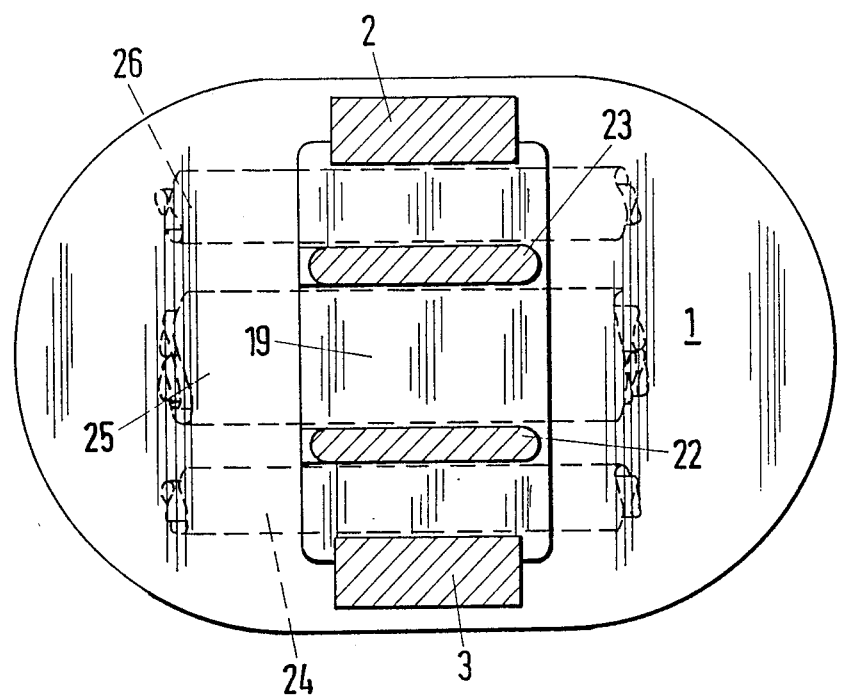
FIG. 2 shows a section along the line II—II of FIG. 1.

FIG. 2 shows a simplified representation of the partition web 19, the cables 24, 25 and 26, the two transverse webs 2 and 3, the intermediate webs 22 and 23 and, behind these, the side plate 1.

Figure 4:
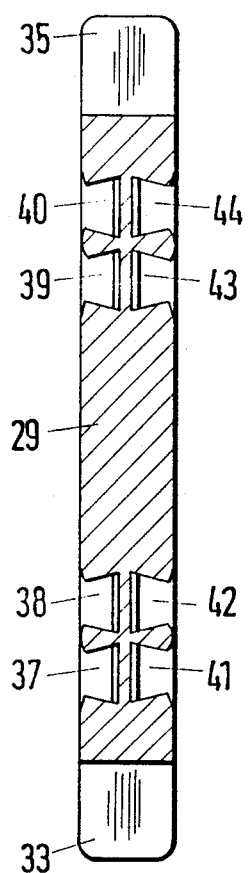
FIG. 4 shows a section along the line IV—IV of FIG. 3.
Figure 3:
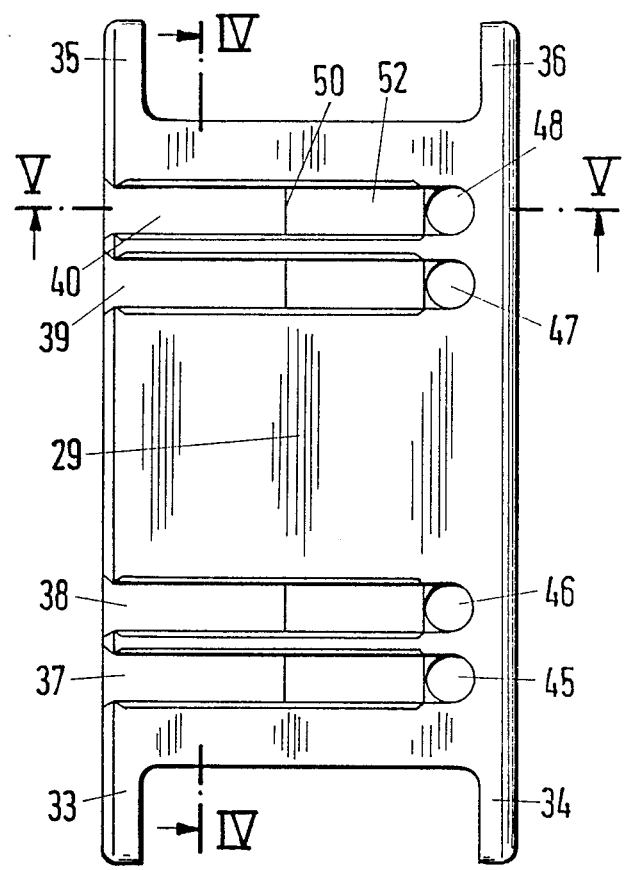
FIG. 3 shows a side view of a partition web according to FIG. 1.
Figure 5:
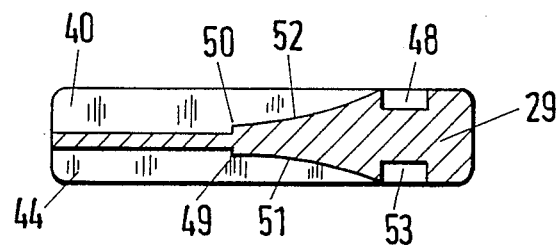
FIG. 5 shows a section along the line V—V of FIG. 3.

FIGS. 3 to 5 show a partition web 29 which can be used both for the first type and for the other, or second type of chain link, with supporting lugs 33 to 36 and essentially dovetail-shaped retaining grooves 37 to 44 on both sides, and a special design of the bottom of the retaining grooves. As can be seen especially from the sectional representation of FIG. 5, the retaining groove 40 to 44 extends at the same depth only over some of its length, in particular as far as the step 49, 50. At the abovementioned step, the depth of the retaining groove diminishes by a fraction and then continues to decrease along the curved slope faces 51, 52, ending completely approximately in the last quarter of the total width of the partition web 29. Behind the end of this groove there are then locking holes 48, 53, the significance of which will be explained below.

The remaining grooves 37 to 39 and 41 to 43 are of a design corresponding to that of the grooves 40 and 44.

Figure 6:
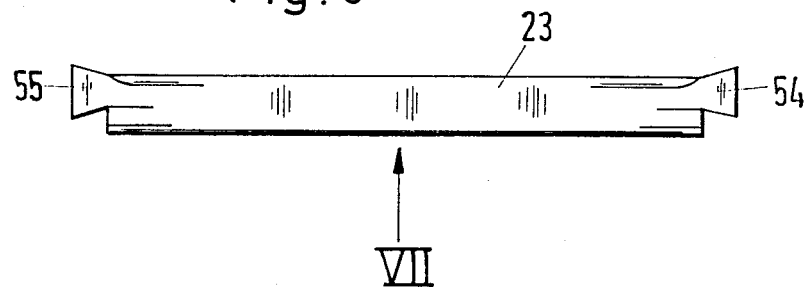
FIG. 6 shows the end face of an intermediate web.
Figure 7:
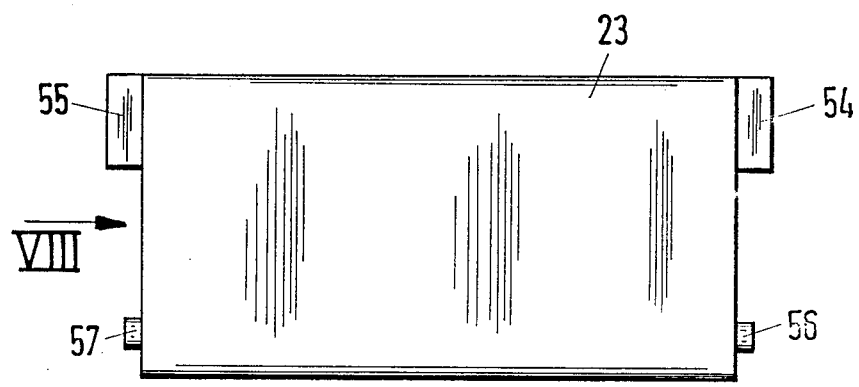
FIG. 7 shows a view in the direction of the arrow VII of FIG. 6.
Figure 8:
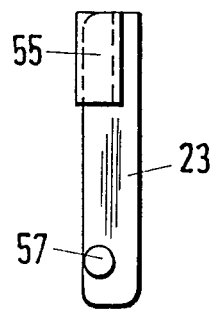
FIG. 8 shows a view in the direction of the arrow IIX of FIG. 7.

Before the special design of the retaining grooves and the function of the locking holes are described in more detail, the form of the intermediate webs which is associated with this and which is shown in FIGS. 6 to 8 is treated in more detail.

As can be seen from FIGS. 7 and 8, the locking lugs 54 and 55 of the intermediate web 23 extend only over some of the length of the end faces. In the vicinity of the other end of these end faces, locking studs 56, 57 project from these end faces. Both the locking lugs and the locking studs are offset somewhat out of the midplane of the intermediate web.

When the intermediate web 23 is being inserted into one of the various retaining grooves of the partition web 29, for example into the retaining groove 40, the locking stud 56 is first introduced into the groove. When it is pushed in further, the locking stud 56 then jumps over the step 50 (FIG. 5) and slides upwards along the slope 52, until the locking lug 54 finally slides into the groove 40. Lastly, as a result of the exertion of slight pressure on the top of the intermediate web 23, the locking stud 56 engages into the locking hole 48 intended for it. The intermediate web 23 is now prevented from sliding out or being pushed out of the groove 40 of the partition web 29. The other intermediate webs are also inserted and locked in a corresponding way.

As is evident from FIGS. 3 and 4, each partition web has several retaining grooves, specifically two retaining grooves extending relatively closely next to one another at the upper end and two identical retaining grooves at the lower end. Because the intermediate webs are pushed into one of these retaining grooves or the other, the heights of the compartments can be selected according to requirements. An intermediate position also becomes possible because of the offset position of the locking lugs, if the intermediate web is inserted in one position or in the reverse position.

As already mentioned, it is sufficient if the closing web 4 (FIG. 1) for a chain link of the other or second type has retaining grooves only on the side facing the interior. However, a closing web with retaining grooves arranged on both sides can, of course, also be used here and thereby simplifies the stockkeeping.

Figure 1A:
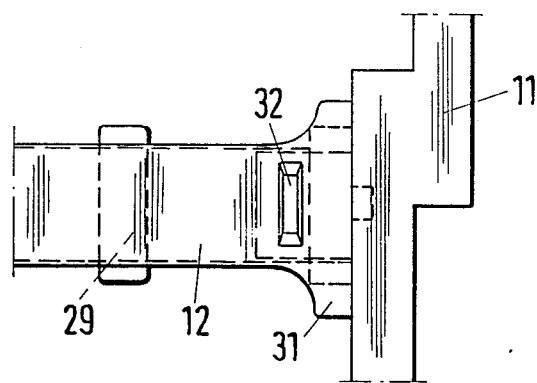
FIG. 1a shows a top view of the end of a transverse web for a chain link of another type, as seen in the direction of the arrow Ia in FIG. 1.
Figure 9:
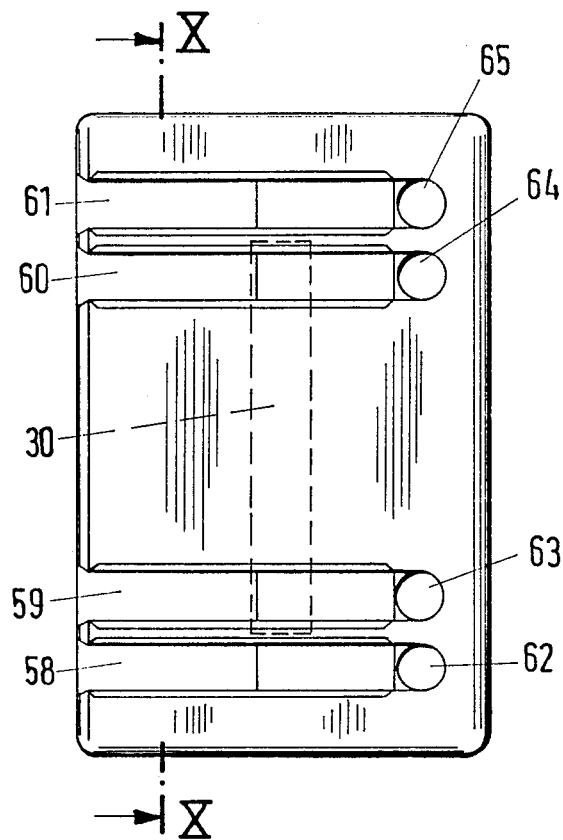
FIG. 9 shows a view of a closing web in a representation similar to that of a partition web in FIG. 3.
Figure 10:
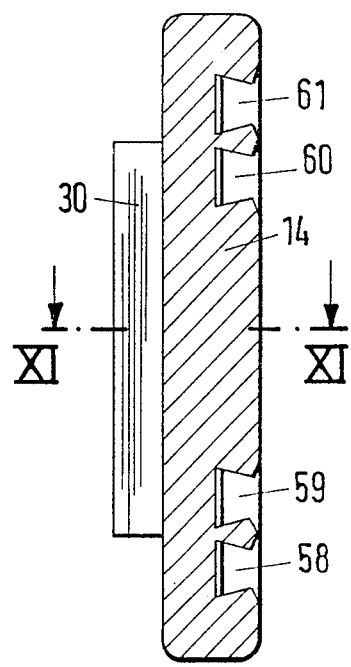
FIG. 10 shows a section along the line X—X of FIG. 9.
Figure 11:
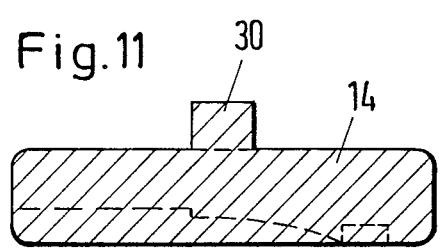
FIG. 11 shows a section along the line XI—XI of FIG. 10.

In the closing web 14 for chain links of the second type, the arrangement of retaining grooves on the inner side only is appropriate, as emerges from FIG. 1 and from FIGS. 9 to 11. Otherwise, these retaining grooves 58 to 61 (FIGS. 9 and 10) are designed in the same way as the retaining grooves of the partition webs 29 or 19, that is to say in the way illustrated in FIG. 5 for such a partition web.

On the face of the closing web 14 located opposite the grooves, a fitting rib 30 projects from this, approximately in its centre, and, when the chain link is assembled, is received by a fitting groove of corresponding shape and size in the adjacent side plate 11.

A chain link is assembled in the following way:

After the side walls have been joined to the transverse webs, that is to say either screwed together or, in chain links of the second type, plugged together, a closing web is inserted between the transverse webs at each of the two side plates and pushed close up to the side plate. Where a closing web for chain link of the newer type is concerned, the fitting rib 30 thereby engages into the corresponding fitting groove.

The desired number of partition webs between the transverse webs are then inserted between the two side plates by first introducing these partition webs at an oblique angle and then rotating them into the final position.

Lastly, after the partition webs have been displaced along the transverse webs into their desired position, the intermediate webs, with their locking lugs in front, are pushed into the corresponding retaining grooves of the partition webs or of the closing webs and locked by means of the locking studs and locking holes.

All the parts of the chain link now constitute a rigid unreleasable unit. It is possible to separate the individual inserts by removing the locking studs from their locking holes on each intermediate web as a result o slight pressure and then pulling the partition webs out again.

I claim:

1. A chain link for a power-supply chain, the said chain link comprising in combination;

two side plates (1; 11) connected by means of transverse webs (2, 3, 12, 13) and having articulated connection means for connecting to adjacent chain links;

partition webs (4, 19, 29) for subdividing said side plates and transverse webs inserted between the transverse webs and extending perpendicularly to said transverse webs;

intermediate webs (5, 6, 22. 23) inserted between adjacent partition webs and extending perpendicularly relative to said partition webs;

wherein the partition webs (4, 19, 29) have corners, are plates, are located displaceably between the transverse webs (2,3, 12, 13), and have supporting lugs (33, 34, 35, 36) at said corners;

said supporting lugs projecting and engaging in pairs the transverse webs and preventing their dislodgement therefrom;

said partition webs having on both sides one or more retaining grooves (37-44) distributed over their height and aligned respectively with one another and locking lugs (54, 55) on ends of said intermediate webs (5, 6, 22, 23) which are inserted selectively into of the retaining grooves.

2. A chain link according to claim 1, wherein a closing web is connected at one end of the transverse webs (14);

said closing web having a fitting rib one side and resting against one of said side plates (30) which rib engages a fitting groove of corresponding shape and size in said side plate and which rib extends in the direction parallel to the partition webs and from one transverse web to the other; and said closing web having one or more retaining grooves located on a side opposite the fitting rib (58-61) which are distributed over its height and which are aligned with the retaining grooves (37-44) in the partition webs (4, 19, 29).

3. A chain link according to claim 1, wherein the locking lugs (54, 55) extend along only a portion of the length of end faces of the intermediate webs (5, 6; 22, 23),.;

wherein near one end of said end faces, locking studs (56 57) project from said end faces; and wherein locking holes (45, 46, 47, 48) for the locking reception of the locking studs are provided in the partition webs (19, 29) adjacent the retaining grooves.

4. A chain link according to claim 3, wherein each retaining groove comprises a bottom having (37-40) a sloped (51, 52) surface at one end thereof for guiding the locking stud (56, 57) into the locking hole (48,53).

* * * * *